United States Patent
Kook et al.

(10) Patent No.: US 9,709,135 B1
(45) Date of Patent: Jul. 18, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Gyeonggi-do (KR); Hyun Sik Kwon, Seoul (KR); Wonmin Cho, Gyeonggi-do (KR); Seong Wook Hwang, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/226,009

(22) Filed: Aug. 2, 2016

(30) Foreign Application Priority Data

Mar. 16, 2016 (KR) .................. 10-2016-0031676

(51) Int. Cl.
  *F16H 3/60* (2006.01)
  *F16H 3/66* (2006.01)
(52) U.S. Cl.
  CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
  CPC .......................................... F16H 3/66
  See application file for complete search history.

(56) References Cited

U.S. PATENT DOCUMENTS

| | | | |
|---|---|---|---|
| 9,587,716 B1* | 3/2017 | Park | F16H 3/66 |
| 9,599,197 B1* | 3/2017 | Park | F16H 3/66 |
| 2006/0205556 A1* | 9/2006 | Klemen | F16H 3/66 |
| | | | 475/296 |
| 2013/0150203 A1* | 6/2013 | Park | F16H 3/663 |
| | | | 475/276 |
| 2016/0333977 A1* | 11/2016 | Hwang | F16H 3/66 |
| 2017/0074364 A1* | 3/2017 | Kwon | F16H 3/66 |
| 2017/0074369 A1* | 3/2017 | Park | F16H 3/66 |

* cited by examiner

*Primary Examiner* — Derek D Knight
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided. In particular, nine or more forward speeds and one or more reverse speed are achieved by the planetary gear train of an automatic transmission for a vehicle. The gear set includes an input shaft, an output shaft, four planetary gear sets respectively having three rotational elements, and six control elements for selectively interconnecting the rotational elements and a transmission housing.

6 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | | | | ● | | ● | 5.720 |
| D2 | | | ● | | | ● | 3.500 |
| D3 | | | ● | ● | | | 2.476 |
| D4 | | | ● | | ● | | 1.694 |
| D5 | ● | | ● | | | | 1.196 |
| D6 | | ● | ● | | | | 1.000 |
| D7 | ● | ● | | | | | 0.867 |
| D8 | | ● | | | ● | | 0.722 |
| D9 | | ● | | ● | | | 0.641 |
| REV | ● | | | | | ● | 4.333 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0031676 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to an automatic transmission that obtains shift-stages of at least nine forward speed and at least one reverse speed using a minimal number of parts.

(b) Description of the Related Art

In the field of an automatic transmission, more multiplicity of shift-stages is useful for enhancement of fuel consumption and drivability of a vehicle. Recently, increase of oil price is triggering a competition in enhancing fuel consumption of a vehicle. Accordingly, research has been conducted in regards to an engine to achieve weight reduction and enhance fuel consumption by downsizing and research regarding an automatic transmission has been conducted to simultaneously provide better drivability and fuel consumption by achieving more shift stages. To achieve more shift-stages for an automatic transmission, the number of parts is typically increased, which may deteriorate installability, production cost, weight and/or power flow efficiency. Therefore, to maximally enhance fuel consumption of an automatic transmission having more shift-stages, it is important that improved efficiency is derived by less number of parts.

In this background, an eight-speed automatic transmission has been introduced recently and a planetary gear train for an automatic transmission enabling more shift-stages is being researched. An automatic transmission of eight or more shift-stages typically includes three to four planetary gear sets and five to six control elements (frictional elements), and may become lengthy, thereby deteriorating installability. Accordingly, disposing planetary gear sets in parallel or employing dog clutches instead of wet-type control elements has been attempted. However, such an arrangement may not be widely applicable, and using dog clutches may deteriorate shift-feel.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle having advantages of obtaining shift-stages of at least nine forward speeds and at least one reverse speed by minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention may include an input shaft configured to receive an engine torque, an output shaft configured to output a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, a first shaft connected with the first rotational element and directly connected with the transmission housing, a second shaft interconnecting the second rotational element, the sixth rotational element, and the seventh rotational element and selectively connected with the transmission housing, a third shaft connected with the third rotational element, a fourth shaft connected with the fourth rotational element, directly connected with the input shaft, and selectively connected with the third shaft, a fifth shaft connected with the fifth rotational element and selectively connected with the first shaft, a sixth shaft connecting the eighth rotational element and the twelfth rotational element, selectively connected with the fourth shaft and selectively connected with the transmission housing, a seventh shaft interconnecting the ninth rotational element and the eleventh rotational element and directly connected with the output shaft, and an eighth shaft connected with the tenth rotational element and selectively connected with the fourth shaft.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to an exemplary embodiment of the present invention may further include a first clutch that selectively connects the third shaft and the fourth shaft, a second clutch that selectively connects the fourth shaft and the sixth shaft, a third clutch that selectively connects the fourth shaft and the eighth shaft, a fourth clutch that selectively connects the first shaft and the fifth shaft, a first brake that selectively connects the second shaft and the transmission housing, and a second brake that selectively connects the sixth shaft and the transmission housing.

A planetary gear train according to an exemplary embodiment of the present invention may realize at least nine forward speeds and at least one reverse speed by operating the four planetary gear sets of simple planetary gear sets by operating six control elements. In addition, a planetary gear train according to an exemplary embodiment of the present invention may substantially improve driving stability by realizing shift-stages appropriate for rotation speed of an engine due to multi-stages of an automatic transmission. The planetary gear train according to an exemplary embodiment of the present invention may further maximize engine driving efficiency by multi-stages of an automatic transmission, and improve power delivery performance and fuel consumption.

Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 2 is an operational chart for respective control elements at respective shift-stages in a planetary gear train according to an exemplary embodiment of the present invention.

DETAILED DESCRIPTION

Figure 1:
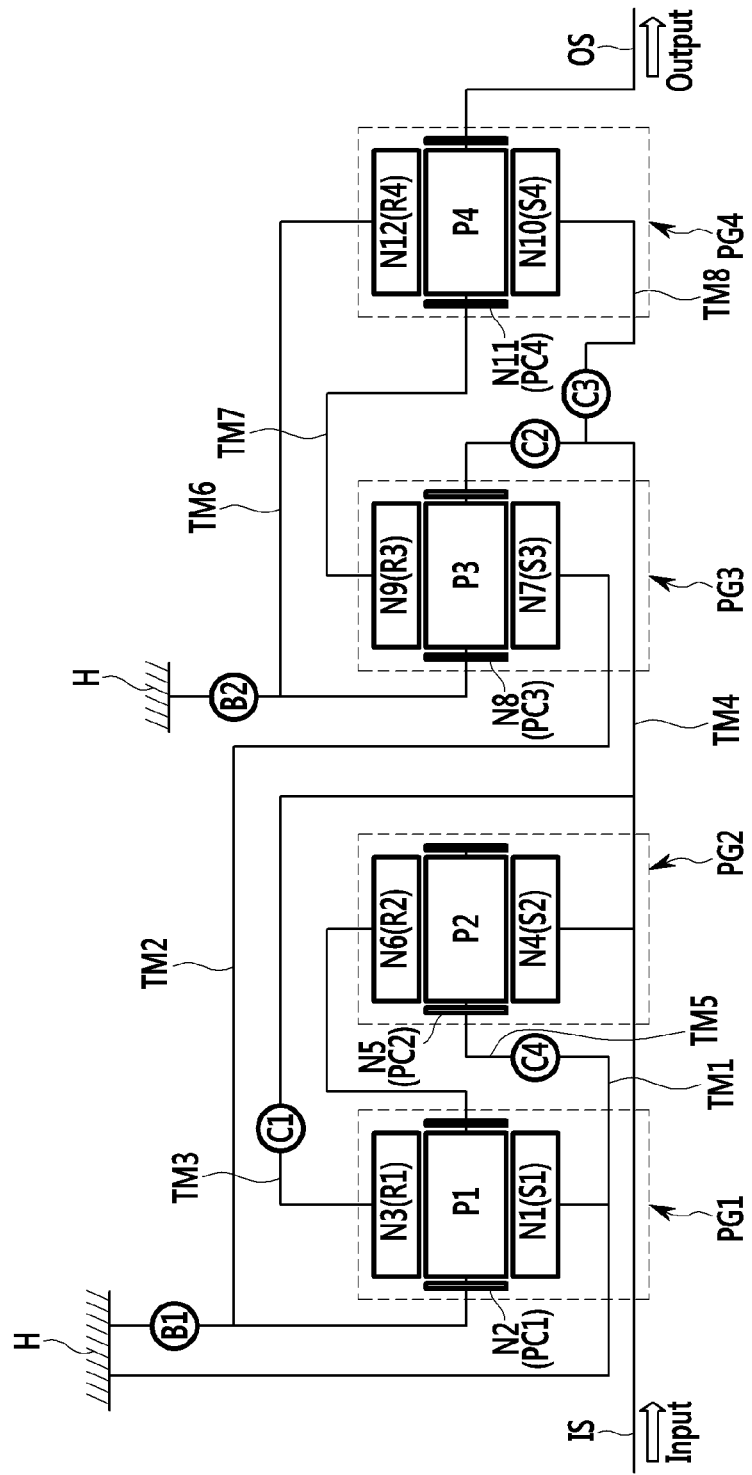
FIG. 1 is a schematic diagram of a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. The drawings and description are to be regarded as illustrative in nature and not restrictive, and like reference numerals designate like elements throughout the specification. In the following description, dividing names of components into first, second and the like is to divide the names because the names of the components are the same as each other and an order thereof is not particularly limited.

FIG. 1 is a schematic diagram of a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 disposed on a same axis, an input shaft IS, an output shaft OS, eight shafts TM1 to TM8 connected with rotational elements of the first, second, third, and fourth planetary gear sets PG1, PG2, PG3, and PG4, control elements of four clutches C1 to C4 and two brakes B1 and B2, and a transmission housing H. The various control elements may be operated by a controller.

In particular, torque input from the input shaft IS may be shifted by cooperative operation of the first, second, third, and fourth planetary gear sets PG1, PG2, PG3, and PG4, and then output through the output shaft OS. The planetary gear sets may be disposed in the order of first, second, third, and fourth planetary gear sets PG1, PG2, PG3, and PG4, from an engine side. The input shaft IS is an input member and the torque from a crankshaft of an engine may be input into the input shaft IS, after being torque-converted by a torque converter. The output shaft OS is an output member, may be disposed on a same axis with the input shaft IS, and may be configured to deliver a shifted driving torque to a drive shaft using a differential apparatus.

The first planetary gear set PG1 is a single pinion planetary gear set, and may include a first sun gear S1, a first planet carrier PC1 that supports first pinion gear P1 externally engaged with the first sun gear S1, and a first ring gear R1 internally gear-meshed with the first pinion gear P1. The first sun gear S1 may operate as a first rotational element N1, the first planet carrier PC1 may operate as a second rotational element N2, and the first ring gear R1 may operate as a third rotational element N3.

The second planetary gear set PG2 is a single pinion planetary gear set, and may include a second sun gear S2, a second planet carrier PC2 that supports second pinion gear P2 externally engaged with the second sun gear S2, and a second ring gear R2 internally gear-meshed with the second pinion gear P2. The second sun gear S2 may operate as a fourth rotational element N4, the second planet carrier PC2 may operate as a fifth rotational element N4, and the second ring gear R2 may operate as a sixth rotational element N6.

The third planetary gear set PG3 is a single pinion planetary gear set, and may include a third sun gear S3, a third planet carrier PC3 that supports third pinion gear P3 externally engaged with the third sun gear S3, and a third ring gear R3 internally gear-meshed with the third pinion gear P3. The third sun gear S3 may operate as a seventh rotational element N7, the third planet carrier PC3 may operate as an eighth rotational element N8, and the third ring gear R3 may operate as a ninth rotational element N9.

The fourth planetary gear set PG4 is a single pinion planetary gear set, and may include a fourth sun gear S4, a fourth planet carrier PC4 that supports fourth pinion gear P4 externally engaged with the fourth sun gear S4, and a fourth ring gear R4 internally gear-meshed with the fourth pinion gear P4. The fourth sun gear S4 may operate as a tenth rotational element N10, the fourth planet carrier PC4 may operate as an eleventh rotational element N11, and the fourth ring gear R4 may operate as a twelfth rotational element N12.

In the arrangement of the first, second, third, and fourth planetary gear sets PG1, PG2, PG3, and PG4, the second rotational element N2 may be directly connected with the sixth rotational element N6 and the seventh rotational element N7, the eighth rotational element N8 may be directly connected with the twelfth rotational element N12, and the ninth rotational element N9 may be directly connected with the eleventh rotational element N11, by eight shafts TM1 to TM8. The eight shafts TM1 to TM8 may be arranged as follows. Each of the eight shafts TM1 to TM8 may be a rotational member that directly interconnects the input and output shafts and rotational elements of the planetary gear sets PG1, PG2, PG3, and PG4, or may be a fixed member fixed to the transmission housing H.

The first shaft TM1 may be connected with the first rotational element N1 (first sun gear S1), and directly connected with the transmission housing H to operate as a fixed element. The second shaft TM2 may directly connect the second rotational element N2 (first planet carrier PC1), the sixth rotational element N6 (second ring gear R2), and seventh rotational element N7 (third sun gear S3), and may be selectively connected with the transmission housing H, to selectively operate as a fixed element. The third shaft TM3 may be connected with third rotational element N3 (first ring gear R1).

The fourth shaft TM4 may be connected with the fourth rotational element N4 (second sun gear S2), directly connected with the input shaft IS to operate as an input element, and may be selectively connected with the third shaft TM3. The fifth shaft TM5 may be connected with the fifth rotational element N5 (second planet carrier PC2), and selectively connected with the first shaft TM1 connected with the transmission housing H, to selectively operate as a selective fixed element. The sixth shaft TM6 may interconnect the eighth rotational element N8 (the third planet carrier PC3) and the twelfth rotational element N12 (the fourth ring gear R4), selectively connected with the input shaft IS to selectively operate as an selective input element, and may be selectively connected with the transmission housing H to selectively operate as a fixed element.

The seventh shaft TM7 may interconnect the ninth rotational element N9 (third ring gear R3) and the eleventh rotational element N11 (fourth planet carrier PC4), and may be directly connected with the output shaft OS, to operate as an output element. The eighth shaft TM8 may be connected with the tenth rotational element N10 (fourth sun gear S4), and selectively connected with the input shaft IS, to selectively operate as an input element. The eight shafts TM1 to TM8, the input shaft IS, and the output shaft OS may be selectively interconnected with one another via control elements of four clutches C1, C2, C3, and C4. The eight shafts TM1 to TM8 may be selectively connected with the transmission housing H, via control elements of two brakes B1 and B2.

The first clutch C1 may be disposed between the third shaft TM3 and the fourth shaft TM4, and may selectively connect the third shaft TM3 and the fourth shaft TM4, to adjust power delivery therebetween. The second clutch C2 may be disposed between the fourth shaft TM4 and the sixth shaft TM6, and may selectively connect the fourth shaft TM4 and the sixth shaft TM6, to adjust power delivery therebetween. The third clutch C3 may be disposed between the fourth shaft TM4 and the eighth shaft TM8, and may selectively connect the fourth shaft TM4 and the eighth shaft TM8, to adjust power delivery therebetween. The fourth clutch C4 may be disposed between the first shaft TM1 and the fifth shaft TM5, and may selectively connect the first shaft TM1 and the fifth shaft TM5, to adjust power delivery therebetween. The first brake B1 may be disposed between the second shaft TM2 and the transmission housing H, and may selectively connect the second shaft TM2 to the transmission housing H. The second brake B2 may be disposed between the sixth shaft TM6 and the transmission housing H, and may selectively connect the sixth shaft TM6 to the transmission housing H.

FIG. 1 illustrates that the third shaft TM3, the sixth shaft TM6, and the eighth shaft TM8 may be selectively connected with the fourth shaft TM4 through the first clutch C1, the second clutch C2, and third clutch C3, respectively. In particular, it may be understood that the third shaft TM3, the sixth shaft TM6, and the eighth shaft TM8 may be selectively connected with the input shaft IS via the first clutch C1, the second clutch C2, and the third clutch C3, since the fourth shaft TM4 may be directly connected with the input shaft IS. The control elements of the first, second, third, and fourth clutches C1, C2, C3, and C4 and the first and second brakes B1 and B2 may be realized as multi-plate hydraulic pressure friction devices that are frictionally engaged by hydraulic pressure.

FIG. 2 is an operational chart for respective control elements at respective shift-stages in a planetary gear train according to an exemplary embodiment of the present invention. Referring to FIG. 2, a planetary gear train according to an exemplary embodiment of the present invention may realize nine forward speeds and one reverse speed by operating two control elements among the first, second, third, and fourth clutches C1, C2, C3, and C4 and the first and second brakes B1 and B2 at respective shift-stages.

In the forward first speed D1, the fourth clutch C4 and the second brake B2 may be operated simultaneously. As a result, the first shaft TM1 may be connected with the fifth shaft TM5 by the operation of the fourth clutch C4. In particular, the torque of the input shaft IS may be input to the fourth shaft TM4. In addition, the first shaft TM1 may operate as a fixed element. The fifth shaft TM5 and the sixth shaft TM6 may operate as a fixed element by the operation of the fourth clutch C4 and the second brake B2, thereby realizing the forward first speed by cooperative operation of respective shafts and may be configured to output a shifted torque to the output shaft OS connected with the seventh shaft TM7. The gear ratio of such an operation may be about 5.72.

In the forward second speed D2, the third clutch C3 and the second brake B2 may be operated simultaneously. As a result, the eighth shaft TM8 may be connected with the input shaft IS by the operation of the third clutch C3. In particular, the torque of the input shaft IS may be input simultaneously to the fourth shaft TM4 and the eighth shaft TM8. In addition, the first shaft TM1 may operate as a fixed element. In particular, the sixth shaft TM6 may operate as a fixed element by the operation of the second brake B2, thereby realizing the forward second speed by cooperative operation of respective shafts and may be configured to output a shifted torque to the output shaft OS connected with the seventh shaft TM7. The gear ratio of such an operation may be about 3.5.

In the forward third speed D3, the third and fourth clutches C3 and C4 may be operated simultaneously. As a result, the eighth shaft TM8 may be connected with the input shaft IS by the operation of the third clutch C3, and the first shaft TM1 may be connected with the fifth shaft TM5 by the operation of the fourth clutch C4. In particular, the torque of the input shaft IS may be input simultaneously to the fourth shaft TM4 and the eighth shaft TM8. In addition, the first shaft TM1 may operate as a fixed element. In particular, the fifth shaft TM5 may simultaneously operate as a fixed element by the operation of the fourth clutch C4, thereby realizing the forward third speed by cooperative operation of respective shafts and may be configured to output a shifted torque to the output shaft OS connected with the seventh shaft TM7. The gear ratio of such an operation may be about 2.476.

In the forward fourth speed D4, the third clutch C3 and the first brake B1 may be operated simultaneously. As a result, the eighth shaft TM8 may be connected with the input shaft IS by the operation of the third clutch C3. In particular, the torque of the input shaft IS may be input simultaneously to the fourth shaft TM4 and the eighth shaft TM8. In addition, the first shaft TM1 may operate as a fixed element. In particular, the second shaft TM2 may operate as a fixed element by the operation of the first brake B1, thereby realizing the forward fourth speed by cooperative operation of respective shafts and may be configured to output a shifted torque to the output shaft OS connected with the seventh shaft TM7. The gear ratio of such an operation may be about 1.694.

In the forward fifth speed D5, the first and third clutches C1 and C3 may be operated simultaneously operated. As a result, the third shaft TM3 may be connected with the fourth shaft TM4 by the operation of the first clutch C1, and the eighth shaft TM8 may be connected with the input shaft IS by the operation of the third clutch C3. In particular, the torque of the input shaft IS may be input simultaneously to the fourth, third, eighth shafts TM4, TM3, and TM8. In addition, the first shaft TM1 may operate as a fixed element, thereby realizing the forward fifth speed by cooperative operation of respective shafts and may be configured to output a shifted torque to the output shaft OS connected with the seventh shaft TM7. The gear ratio of such an operation may be about 1.196.

In the forward sixth speed D6, the second and third clutches C2 and C3 may be operated simultaneously. As a result, the sixth shaft TM6 may be connected with the input shaft IS by the operation of the second clutch C2, and the eighth shaft TM8 may be connected with the input shaft IS by the operation of the third clutch C3. In particular, the torque of the input shaft IS may be input simultaneously to the fourth shaft TM4 and the sixth and eighth shafts TM6 and TM8. While the first shaft TM1 is operating as a fixed element, the third and fourth planetary gear sets PG3 and PG4 may be configured to rotate integrally, to form the forward sixth speed and output the input torque to the output shaft OS connected with the seventh shaft TM7. The gear ratio of such an operation may be about 1.

In the forward seventh speed D7, the first and second clutch C1 and C2 may be operated simultaneously. As a result, the third shaft TM3 may be connected with the fourth shaft TM4 by the operation of the first clutch C1, and the sixth shaft TM6 may be connected with the input shaft IS by the operation of the second clutch C2. In particular, the torque of the input shaft IS may be input simultaneously to the fourth shaft TM4 and the third and sixth shafts TM3 and TM6. In addition, the first shaft TM1 may operate as a fixed element, thereby realizing the forward seventh speed by cooperative operation of respective shafts and may be configured to output a shifted torque to the output shaft OS connected with the seventh shaft TM7. The gear ratio of such an operation may be about 0.867.

In the forward eighth speed D8, the second clutch C2 and the first brake B1 may be operated simultaneously. As a result, the sixth shaft TM6 may be connected with the input shaft IS by the operation of the second clutch C2. In particular, the torque of the input shaft IS may be input simultaneously to the fourth shaft TM4 and the sixth shaft TM6. In addition, the first shaft TM1 may operate as a fixed element. In particular, the second shaft TM2 may operate as a fixed element by the operation of the first brake B1, thereby realizing the forward eighth speed by cooperative operation of respective shafts and may be configured to output a shifted torque to the output shaft OS connected with the seventh shaft TM7. The gear ratio of such an operation may be about 0.722.

In the forward ninth speed D9, the second and fourth clutches C2 and C4 may be operated simultaneously. As a result, the sixth shaft TM6 may be connected with the input shaft IS by the operation of the second clutch C2, and the fifth shaft TM5 may be connected with the first shaft TM1 by the operation of the fourth clutch C4. In particular, the torque of the input shaft IS may be input simultaneously to the fourth shaft TM4 and the sixth shaft TM6. In addition, the first shaft TM1 may operate as a fixed element. In particular, the fifth shaft TM5 may operate simultaneously as a fixed element by the operation of the fourth clutch C4, to realize the forward ninth speed by cooperative operation of respective shafts and may be configured to output a shifted torque to the output shaft OS connected with the seventh shaft TM7. The gear ratio of such an operation may be about 0.641.

In the reverse speed REV, the first clutch C1 and the second brake B2 may be operated simultaneously. As a result, the third shaft TM3 may be connected with the fourth shaft TM4 by the operation of the first clutch C1. In particular, the torque of the input shaft IS may be input simultaneously to the fourth shaft TM4 and the third shaft TM3. In addition, the first shaft TM1 may operate as a fixed element. In particular, the fifth shaft TM5 may operate simultaneously as a fixed element by the operation of the fourth clutch C4, to realize the reverse speed by cooperative operation of respective shafts and may be configured to output a reverse torque to the output shaft OS connected with the seventh shaft TM7. The gear ratio of such an operation may be about 4.333.

As described above, a planetary gear train according to an exemplary embodiment of the present invention may realize at least nine forward speeds and at least one reverse speed by four planetary gear sets PG1, PG2, PG3, and PG4 by operating four clutches C1, C2, C3, and C4 and two brakes B1 and B2. In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine. The planetary gear train according to an exemplary embodiment of the present invention may additionally maximize engine driving efficiency by multi-stages of an automatic transmission, and may improve power delivery performance and fuel consumption.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shaft s

What is claimed is:

1. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
a first shaft connected with the first rotational element and directly connected with the transmission housing;
a second shaft that interconnects the second rotational element, the sixth rotational element, and the seventh rotational element and is selectively connected with the transmission housing;
a third shaft connected with the third rotational element;
a fourth shaft connected with the fourth rotational element, directly connected with the input shaft, and selectively connected with the third shaft;
a fifth shaft connected with the fifth rotational element and selectively connected with the first shaft;
a sixth shaft connecting the eighth rotational element and the twelfth rotational element, selectively connected with the fourth shaft and selectively connected with the transmission housing;
a seventh shaft that interconnects the ninth rotational element and the eleventh rotational element and is directly connected with the output shaft; and
an eighth shaft connected with the tenth rotational element and selectively connected with the fourth shaft.

2. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

3. The planetary gear train of claim 1, further comprising:
a first clutch that selectively connects the third shaft and the fourth shaft;
a second clutch that selectively connects the fourth shaft and the sixth shaft;
a third clutch that selectively connects the fourth shaft and the eighth shaft;
a fourth clutch that selectively connects the first shaft and the fifth shaft;
a first brake that selectively connects the second shaft and the transmission housing; and
a second brake that selectively connects the sixth shaft and the transmission housing.

4. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is directly connected with the fourth rotational element,
wherein the output shaft is directly connected with the eleventh rotational element,
wherein the first rotational element is directly connected with the transmission housing,
wherein the second rotational element is directly connected with the sixth rotational element and seventh rotational element, and selectively connected with the transmission housing,
wherein the third rotational element is selectively connected with the fourth rotational element,
wherein the fifth rotational element is selectively connected with the first rotational element,
wherein the eighth rotational element is directly connected with the twelfth rotational element, selectively connected with the fourth rotational element, and selectively connected with the transmission housing,
wherein the ninth rotational element is directly connected with the eleventh rotational element, and
wherein the tenth rotational element is selectively connected with the fourth rotational element.

5. The planetary gear train of claim 4, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

6. The planetary gear train of claim 4, further comprising:
a first clutch that selectively connects the third rotational element and the fourth rotational element;
a second clutch that selectively connects the fourth rotational element and the eighth rotational element;
a third clutch that selectively connects the fourth rotational element and the tenth rotational element;

a fourth clutch that selectively connects the first rotational element and the fifth rotational element;
a first brake that selectively connects the second rotational element and the transmission housing; and
a second brake that selectively connects the eighth rotational element and the transmission housing.

\* \* \* \* \*